March 14, 1961 D. G. MARSH 2,974,777
IMPACT BRACKET FOR BELT-TROUGHING IDLER
Filed April 27, 1959
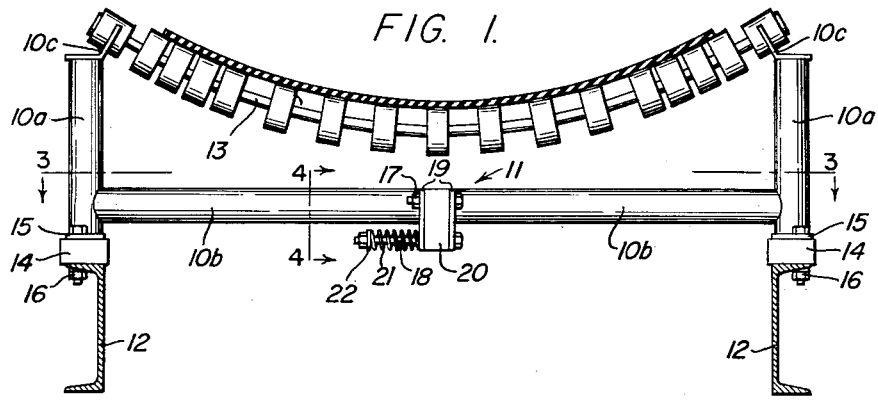
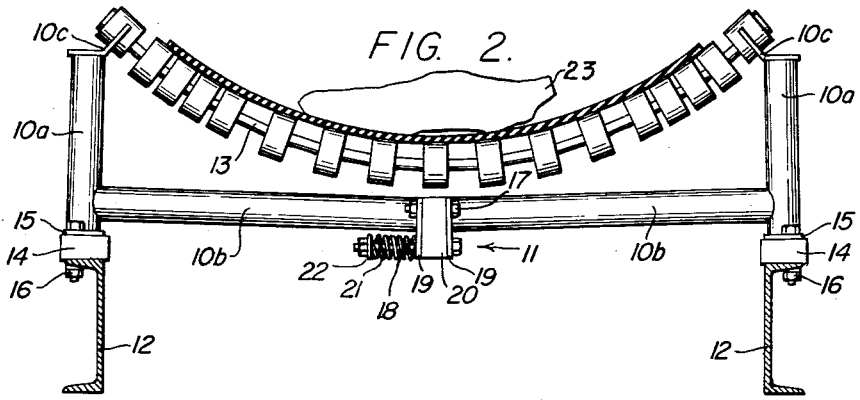
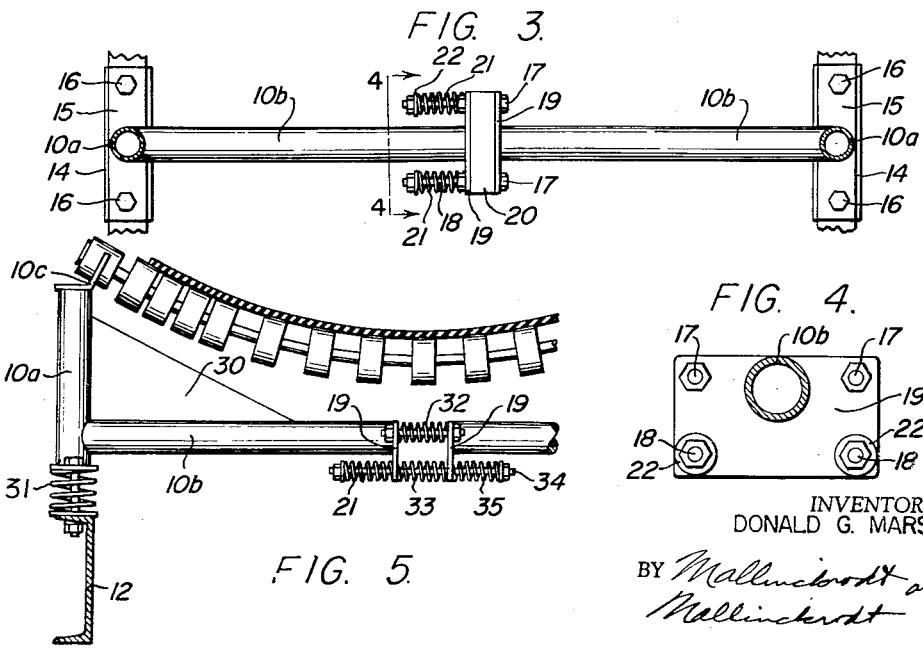
INVENTOR.
DONALD G. MARSH
BY Mallinckrodt and
Mallinckrodt
ATTORNEYS

United States Patent Office 2,974,777
Patented Mar. 14, 1961

2,974,777

IMPACT BRACKET FOR BELT-TROUGHING IDLER

Donald G. Marsh, Ely, Nev., assignor to Kennecott Copper Corporation, New York, N.Y., a corporation of New York Filed Apr. 27, 1959, Ser. No. 809,122

6 Claims. (Cl. 198—192)

This invention relates to so-called troughing idler and bracket structures used to support the materials-receiving and conveying portion of the belt of a belt conveyer.

Belt conveyers used industrially, for example, in connection with mining and quarrying activities, are often subjected to heavy impacts while being loaded. Conventional brackets for mounting the belt-troughing idlers require constant repair or replacement under impact conditions.

Attempts have been made in the past to design idler and bracket structures which would overcome the difficulty. Thus, as early as the year 1903 (see Vrooman U.S. Patent No. 909,833, issued January 12, 1909) the problem was recognized, and various arrangements of springs were proposed for incorporation in the construction of several different types of idler and bracket structures to absorb impact. Much later (see Barnish U.S. Patent No. 2,724,490, issued November 22, 1955) it was proposed that rubber bushings be used in place of springs in a pivoted type of bracket resembling what had been shown in the earlier Vrooman patent.

Presently accepted industrial practice is to use a rigid bracket with a suspension type of troughing idler which offers limited shock absorbing capacity in itself, see Baechli U.S. Patent No. 2,698,077, issued December 28, 1954.

Despite the above-mentioned and other attempts to solve the problem of damage to belts, brackets, and idlers due to impact, the making of repairs, the replacements, and the down-time involved cost industry many thousands of dollars every year.

A principal object of my invention, therefore, is to greatly reduce damage of brackets, idlers, and conveyer belt at impact locations along a belt conveyer system, and to do this by a relatively inexpensive and easily fabricated construction.

Another object is to provide for accommodating excess material on a conveyer belt at locations of overloading.

An outstanding feature of my invention is the provision of rigid bracket sections, interconnected below and intermediate the length of the idler by a resiliently yieldable coupling, which, in presently preferred constructions, includes a block of flexible resilient cushioning material, such as rubber, and a return spring.

Another feature is the mounting of such rigid bracket sections on resilient supports, affording limited movement for the resiliently coupled sections.

Further objects and features of the invention will become apparent from the following detailed description of the presently preferred form thereof illustrated by way of example in the accompanying drawing.

In the drawing:

Fig. 1 represents a transverse vertical section through a belt conveyer system immediately forwardly of a belt-troughing idler and impact bracket conforming to the invention, such idler and bracket appearing in front elevation;

Fig. 2, a view corresponding to that of Fig. 1, but showing the conveyer belt, idler, and bracket under impact;

Fig. 3, a horizontal section taken on the line 3—3 of Fig. 1;

Fig. 4, a fragmentary vertical section taken on the line 4—4 of Fig. 1 and showing the resiliently yieldable coupling in side elevation; and Fig. 5, a fragmentary view corresponding to a portion of Fig. 1, but illustrating an alternative construction.

Referring to the drawing:

In the illustrated form of Figs. 1-4, the impact bracket of the invention includes a pair of rigid bracket sections, here designated 10, respectively, interconnected by a resiliently yieldable coupling 11. Each of such bracket sections is flexibly mounted on a firm support, here shown as a structural channel 12, and serves to support one end of a belt-troughing idler 13 of well known type.

Each bracket section 10 is made up of a rigid leg member 10a and a rigid, cantilever arm 10b extending rigidly from such leg member at a location sufficiently far below the upper end thereof to more than adequately accommodate the belt-troughing idler 13, which may be of conventional type, as shown, attached to the upper ends of bracket leg members 10a by conventional mounting means 10c.

In the present instance, the flexible mounting of each bracket section is accomplished by interposing a block of rubber 14 between the lower end of leg 10a and supporting channel 12 and securely bolting the same in place. For this purpose, an elongate plate 15 is welded or otherwise secured to the bottom of the leg, and bolts 16 are passed through plate, rubber block, and channel, it being realized that block 14 is of elongate configuration to correspond with the plate.

The pair of rigid bracket sections 10 are oppositely disposed, with their cantilever arms 10b extending toward and facing each other. The mutually opposed ends of such cantilever arms are articulatively interconnected by fastening means, which, in this instance, take the form of upper and lower sets of bolts 17 and 18, respectively, which are passed through face plates 19 welded to and projecting laterally from the mutually confronting ends, respectively, of cantilever arms 10b. It will be noted that such ends are mutually spaced apart and that the lower set of bolts 18 are excessively long, affording ample leeway for articulative movement of the bracket sections about an axis extending longitudinally of the conveyer belt and disposed intermediate the length of the idler 12.

Resilient cushioning means are interposed between the mutually opposite ends of the cantilever arms 10b as a buffer under impact conditions. In this illustrated embodiment of the invention, such means takes the form of a block of rubber 20 yieldably interconnecting the face plates 19. The bolts 17 and 18 pass through such block of rubber, which is preferably coextensive with the face plates.

In order to firmly but yieldably hold the bracket in proper idler-supporting position under normal loads, there is provided resilient means operative upon the mutually opposite ends of the cantilever arms and tending to urge such arms toward each other. As illustrated, such resilient means are advantageously in the form of coil, compression springs 21 encircling the respective bolts 18 of the lower set and bearing against the rear face of a face plate 19 and against respective retaining washers 22.

It is preferred that the several bolts 17 and 18 be provided with lock nuts of any suitable type. Also, in order not to encumber the space normally provided between bracket arms 10b and belt-troughing idler 13, the face plates 19 are secured at their upper end portions to the confronting ends of bracket arms 10b.

In operation, excessive impact exerted upon conveyer belt, idlers and idler-supporting bracket by a large rock 23, Fig. 2, for example, is absorbed by the yieldably coupled and mounted but otherwise rigid bracket, without excessively straining and damaging any of the component structures. The springs 21, it will be noted, serve to effect a quick come-back of the bracket following deformation thereof, while rubber block 20 flexes as required to accommodate the deformation and to thoroughly absorb and cushion the impact shock. To this end, the bolt holes in plates 15 and 19 should be oversize, preferably by ⅛".

Various alternative structural arrangements are shown in Fig. 5, where parts identical with previously described parts are similarly designated.

Each bracket section 10 is structurally reinforced, as by means of a triangular plate 30 welded to leg member 10a and to cantilever arms 10b. This is advantageous in instances where impacts are likely to be particularly heavy.

Instead of rubber mounting blocks 14 for the bracket leg members 10a, coil springs 31 may be utilized to advantage under certain circumstances, for instance, where overloading at impact locations might otherwise tend to produce spillage. Greater rigidity against sidewise rocking can be obtained by the use of springs at these locations.

If desired, coil springs 32 and 33 may be used in the yieldable coupling between cantilever arms 10b, instead of the rubber block 20 of the previous embodiment. Also, bolts 18 of such previous embodiment may be replaced by still longer bolts 34 and a second set of springs 35 added at the right-hand side of the coupling to complement the springs 21 at the left-hand side.

Other arrangements based on the above teachings will be obvious to those skilled in the art. Accordingly, while the invention is here specifically illustrated and described with respect to certain presently preferred constructions, it is to be understood that various changes may be made without departing from the generic inventive concepts.

I claim:

1. An impact bracket for a belt-troughing idler, comprising a pair of rigid bracket sections, each made up of a rigid leg member having idler engaging means at its upper end and flexible mounting means at its lower end, and a rigid, cantilever arm extending rigidly from said leg member, the said bracket sections being oppositely disposed, with their cantilever arms extending toward and facing each other; fastening means articulatively interconnecting the mutually opposite ends of said cantilever arms; resilient cushioning means interposed between said mutually opposite ends of the cantilever arms; and resilient means operative upon said mutually opposite ends, for firmly but yieldably holding the bracket under normal loads.

2. The impact bracket of claim 1, wherein there are face plates secured to the mutually opposite ends, respectively, of the cantilever arms, said face plates extending across said ends and projecting laterally of said arms; the rigid interconnecting means comprise sets of bolts extending through the upper and lower margins, respectively, of said face plates and through the resilient cushioning means, the bolts of said lower set being excessively long; and the resilient means comprise a set of coil compression springs encircling said excessively long bolts, respectively, and operative between such bolts and the rear face of a face plate.

3. The impact bracket of claim 2, wherein the resilient cushioning means comprises a block of rubber.

4. The impact bracket of claim 3, wherein the resilient cushioning means comprise coil springs.

5. An impact bracket for a belt-troughing idler, comprising a pair of rigid bracket sections, each made up of a rigid leg member having idler-engaging means at its upper end and flexible mounting means at its lower end, and a rigid, cantilever arm extending rigidly from said leg member, the said bracket sections being oppositely disposed, with their cantilever arms extending toward and facing each other; and a resiliently yieldable coupling articulatively interconnecting the mutually opposite ends of said cantilever arms.

6. In a belt conveyor, a bracket for a belt-troughing idler, comprising a pair of rigid bracket sections, each including a rigid leg member having idler-engaging means at its upper end and a rigid, cantilever arm extending rigidly from said leg member remote from said upper end, the said bracket sections being oppositely disposed, with their cantilever arms extending toward and facing each other; flexible mounting means secured to the rigid leg members, respectively, of said bracket sections adjacent to the cantilever arms thereof; and a resiliently yieldable coupling articulatively interconnecting the mutually opposite ends of said cantilever arms.

References Cited in the file of this patent

UNITED STATES PATENTS

| | | |
|---|---|---|
| 2,724,490 | Barnish | Nov. 22, 1955 |
| 2,837,202 | Baechli | June 3, 1958 |